United States Patent [19]

Belmont

[11] 4,119,284
[45] Oct. 10, 1978

[54] RAILROAD HOTBOX INDICATOR

[76] Inventor: Norman J. Belmont, 849 W. Luellan Dr., Roseburg, Oreg. 97470

[21] Appl. No.: 829,640

[22] Filed: Sep. 1, 1977

[51] Int. Cl.² .............................................. B61K 9/04
[52] U.S. Cl. .......................... 246/169 A; 116/DIG. 38
[58] Field of Search ........ 246/169 A, 169 D, DIG. 2; 116/DIG. 38, 101, 114.5

[56] References Cited

U.S. PATENT DOCUMENTS

| 2,952,238 | 9/1960 | Barber | 246/169 A |
| 3,790,777 | 2/1974 | Pelino | 246/169 A |

Primary Examiner—Trygve M. Blix
Assistant Examiner—Reinhard J. Eisenzopf
Attorney, Agent, or Firm—James D. Givnan, Jr.

[57] ABSTRACT

A warning indicator including a housing attachable to the wheel and axle assembly of a railway car. An ejector assembly in the housing is spring biased to deploy a visual indicator in the presence of abnormal bearing temperatures. A fusible retainer, upon being subjected to abnormal temperatures, releases a stem of the ejector assembly which carries a visible indicator, such as a streamer, outwardly into the airstream for display in a highly visible manner. The indicator housing is provided with tool receiving surfaces to facilitate indicator installation and removal.

4 Claims, 5 Drawing Figures

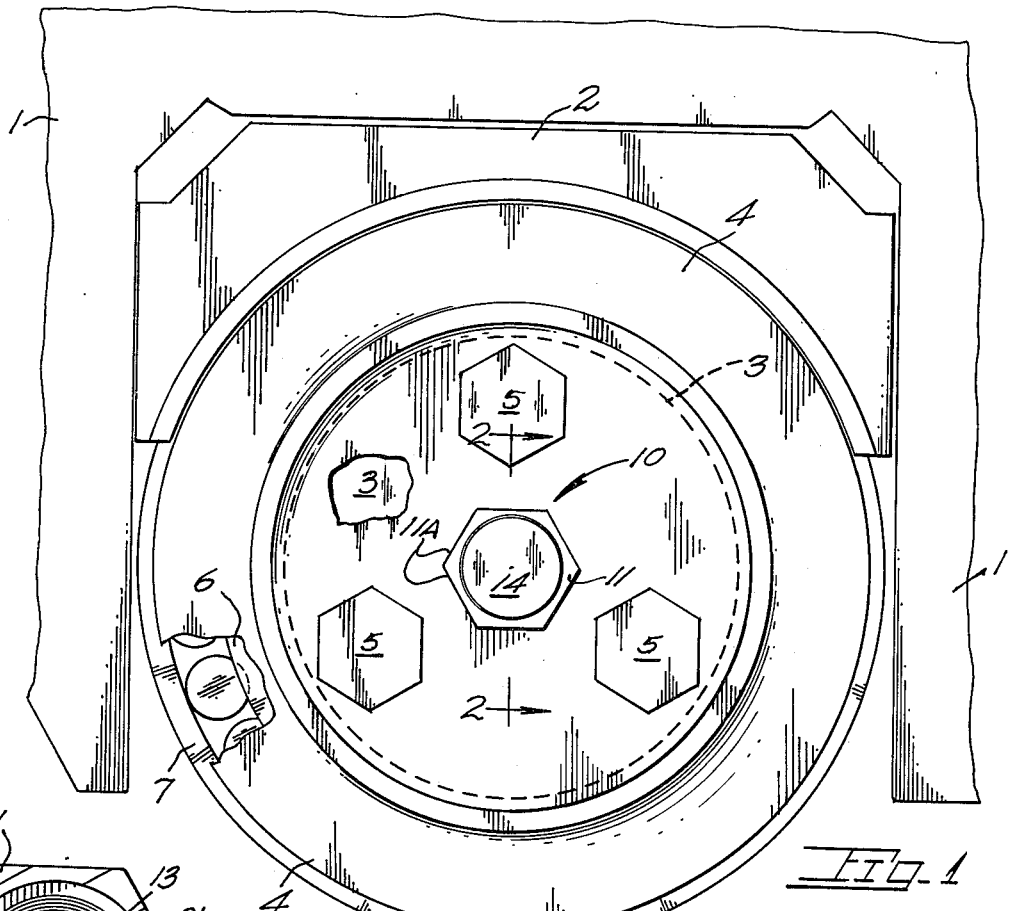
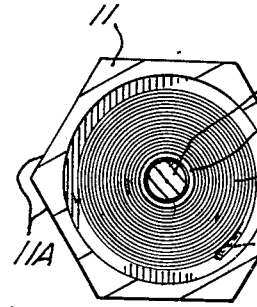
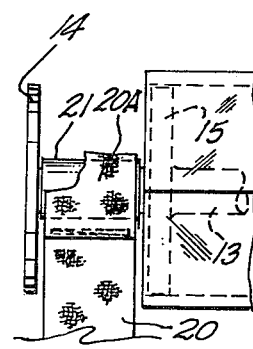
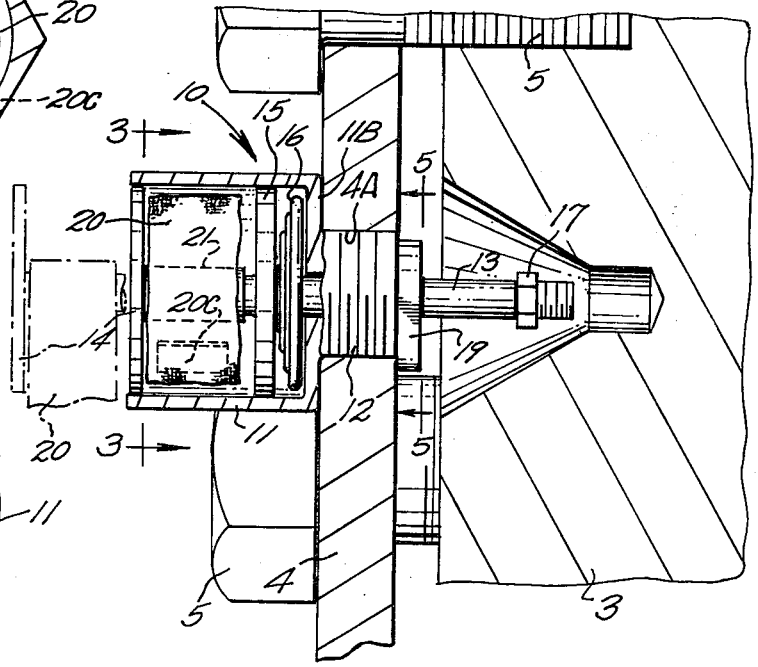

RAILROAD HOTBOX INDICATOR

BACKGROUND OF THE INVENTION

The present invention relates generally to heat sensitive warning devices, and particularly to such a device for indicating excessive temperatures in the wheel bearings of railroad cars.

Every year substantial losses are incurred by railroads by reason of bearing failure resulting in sometimes catastrophic accidents. Efforts to provide indicators for overheated car bearings have included both mechanical indicators as well as sophisticated arrangements utilizing infrared heat sensing equipment located adjacent the track. A number of mechanical type indicators rely on a fusible substance which melts in the presence of high temperatures to gravitationally release a visual signal of one sort or another. While several indicating devices have been proposed, to my knowledge none has found a high degree of acceptance. While infrared heat sensing equipment can detect overheated bearings a problem exists in identifying the car having the bearing problem and secondly, the expense occurred in such a system justifies its use only in high traffic areas. While various warning devices and other heat sensing equipment has been proposed the fact remains that each year brings substantial losses to various railroads by reason of accidents occurring which are ultimately attributable to bearing failure.

SUMMARY OF THE PRESENT INVENTION

The present invention is embodied within a self-contained indicator readily installable within a conventional axle assembly to provide a visual signal when a predetermined temperature in the axle assembly is exceeded.

The present indicator includes a housing for removable engagement with the retainer plate at the end of a car wheel and axle assembly, which housing retains the visual indicator such as a brightly colored streamer displayed in the presence of excessive axle temperatures. The housing is adapted for attachment to the bearing retainer plate of said assembly without modification of the latter to permit lowcost installation of the self-contained unit. A spring biased member is held in a retracted state by a fusible member which releases a stem component to forcibly eject the streamers from the housing. The streamer is attached in a manner permitting rotation of the supporting spindle without winding of the streamer during wheel rotation.

Important objects of the present invention include the provision of a hotbox indicator for railroad cars which is of lowcost, reliable construction readily attachable to a railroad car axle without modification of the latter; the provision of a hotbox indicator relying on positive mechanical means for the ejection of a visual signal such as a colored streamer from its housing to avoid dependence of the device on gravity as is the case with some other hotbox indicators; the provision of an indicator for railroad hotboxes readily installable within an opening in the wheel and axle assembly also used for the application of lubricants.

BRIEF DESCRIPTION OF THE DRAWING

In the accompanying drawing:

FIG. 1 is an end elevational view of the inner end of a railroad car wheel and axle assembly with a bearing retainer plate thereon with the present invention disposed on said plate;

FIG. 2 is a vertical sectional view taken along line 2—2 of FIG. 1;

FIG. 3 is a vertical sectional view taken along line 3-3 of FIG. 2 showing the housing within which is stored coiled streamers;

FIG. 4 is a side elevational view of a fragment of the housing with the streamer operatively disposed; and FIG. 5 is a vertical sectional view taken along line 5-5 of FIG. 2.

DETAILED DESCRIPTION OF THE PREFERRED EMBODIMENT

With continuing attention to the accompanying drawing, applied reference numeral 1 indicates the end of a railroad wheel truck assembly. The wheel truck assembly is adapted in the conventional manner to receive bearing means to journal fore and aft spaced railway wheels of the wheel truck with each wheel located at the opposite end of the axle from that end shown in FIG. 1. Indicated at 2 is a roller bearing adapter for placement within a downwardly open cavity in the wheel truck. A wheel axle is indicated at 3 at the unseen or opposite end of which is mounted the railway wheel. While adapter 2 permits the use of a tapered roller bearing assembly it is to be understood that the present invention is also applicable for use with axle and wheel assemblies journalled in other than roller bearings. Disposed on the viewed end of axle 3 is the inner race 6 of a wheel bearing assembly while the outer race at 7 of same is retained within adapter 2. A retainer plate at 4 is secured to the axle end by bolts 5 and serves to confine the inner race against axial movement. Conventionally, retainer plate 4 is separately apertured at 4A (FIG. 2) to receive an externally threaded plug provided for lubrication purposes. Removal of the threaded plug permits the application of lubricant through opening 4A and ultimately to the bearing assembly.

With attention now to the present invention, the same is indicated generally at 10 and includes a housing 11 which has wrench receiving surfaces as at 11A to facilitate housing installation within plate 4. An externally threaded boss 12 is threadingly engaged with plate opening 4A to permit attachment of the present warning indicator.

Slidably disposed within boss 12 is an ejector assembly including a stem 13 which is provided, adjacent its outer end, with emperforate circular plates 14 and 15. A spiral spring 16 is confined intermediate the end wall 11B of housing 11 and plate 15 and serves to bias the latter and said stem outwardly of the housing.

A stem retaining member is indicated at 19 and, as shown in FIG. 5, is normally engaged with an annular recess 13A formed in the stem. Retainer member 19 is of a heat sensitive material fusible in the presence of a predetermined temperature for the purpose of releasing spring biased stem 13 from its inoperable position shown in FIG. 2.

Stem 13 of the ejector assembly is provided with a limit stop 17 shown as a nut element in place on the inward end of said stem and which serves to restrict outward stem movement upon coming into contact with the inner end of boss 12.

Visual indicating means are shown at 20 which may be in the form of brightly colored streamers stored in housing 11 intermediate plates 14 and 15. A sleeve 21 receives the looped end 20A of a streamer to permit the streamer or streamers to trail from the stem without winding thereabout during operative display of the streamer. The streamer or streamers 20 may be wound about collar 21 as shown in the drawing or merely packed into the housing for ejection from the housing by plate 15. In the stowed position streamer 20 is protected from the elements by end plate 14 which fits snugly within the housing 11. To assure streamer deployment into the airstream the same may be provided with an attached weight 20C at its outer end.

In operation, upon an excessive temperature occurring in the area of the wheel and axle assembly, fusible retainer 19 will commence to fuse to release stem 13 under the action of spiral spring 16. Plate 15 will position the streamer so as to expose same to the airstream whereupon the streamer or streamers (several feet in length) will deploy to provide a visual indication to personnel along the right-of-way. Removal of the indicator is facilitated by tool receiving surfaces 11A available on the housing exterior. An activated indicator may be returned to its inoperative state simply by replacing of the streamer, or other visual indicator used, intermediate the plates 14 and 15, the axial repositioning thereafter of plates 14 and 15 into the housing interior against the action of spring 16 and thereafter the installation of a new fusible element 19. The indicator is then ready for the re-installation in a bearing retainer plate 4.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

1. An indicator operable in the presence of excessive temperatures in an overheated vehicle wheel bearing assembly, said bearing assembly including an axle mounted bearing race retainer plate centrally apertured and thereat mounting said indicator, said indicator comprising,
   a housing for mounting exteriorly of said retainer plate and including a boss in threaded engagement with the aperture in said retainer plate,
   a visual indicator stowed within said housing, and
   an indicator ejector assembly slidably mounted in said housing and operable to reposition the indicator outwardly of the housing, said ejector assembly including a spring biased stem member terminating inwardly adjacent the axle end, a heat sensitive replaceable retainer of a fusible nature engaged with said stem member to normally hold same in an inoperable retracted state, said ejector assembly including resilient means urging the indicator to an exposed position for deployment by the airstream upon fusing of said retainer in the presence of excessive bearing temperatures.

2. The indicator claimed in claim 1 wherein the exteriorly mounted housing is provided with wrench receiving surfaces to facilitate removal and reinstallation of the indicator.

3. The indicator claimed in claim 2 additionally including a limit stop in place on said stem serving to limit outward axial movement of the stem.

4. The indicator claimed in claim 3 wherein said ejector assembly additionally includes an imperforate outer plate serving normally to close the housing to protect the housing interior from the elements.

* * * * *